(12) United States Patent
Sfikas et al.

(10) Patent No.: US 6,565,688 B2
(45) Date of Patent: May 20, 2003

(54) ANGULAR BORDER ON THREE DIMENSIONAL SHEET MATERIAL AND METHOD OF PRODUCING

(75) Inventors: Nicholas Sfikas, Pittsford, NY (US); Terry A. Downey, Fairport, NY (US)

(73) Assignee: Rochester 100 Inc., Rochester, NY (US)

( * ) Notice: Subject to any disclaimer, the term of this patent is extended or adjusted under 35 U.S.C. 154(b) by 157 days.

(21) Appl. No.: 09/918,806

(22) Filed: Aug. 1, 2001

(65) Prior Publication Data

US 2003/0025250 A1 Feb. 6, 2003

(51) Int. Cl.[7] .................. B32B 31/18; B32B 31/00; B65D 27/00; B65D 27/04; B28B 17/00
(52) U.S. Cl. .................. 156/73.3; 156/73.1; 156/251; 156/290; 156/308.4; 156/580.2; 229/72; 281/31; 425/174.2
(58) Field of Search ................ 156/73.1, 73.3, 156/251, 252, 267, 290, 308.2, 308.4, 510, 515, 580.1, 580.2; 264/442, 443, 445; 425/174.2; 428/98, 194, 195; 229/67.1, 67.4, 72; 281/31, 38; 402/73, 502

(56) References Cited

U.S. PATENT DOCUMENTS

| | | | | |
|---|---|---|---|---|
| 4,549,658 A | * | 10/1985 | Sfikas | 206/614 |
| 5,752,721 A | * | 5/1998 | Balbas | 281/19.1 |
| 5,873,513 A | * | 2/1999 | Ong | 229/67.1 |
| 6,254,707 B1 | * | 7/2001 | Sfikas et al. | 156/73.3 |

* cited by examiner

*Primary Examiner*—J. A. Lorengo
(74) *Attorney, Agent, or Firm*—Shlesinger, Arkwright & Garvey LLP

(57) ABSTRACT

The present invention is direct to angular border on three dimensional sheet material and method of producing. This invention is producing an attractive and finely finished article.

20 Claims, 4 Drawing Sheets

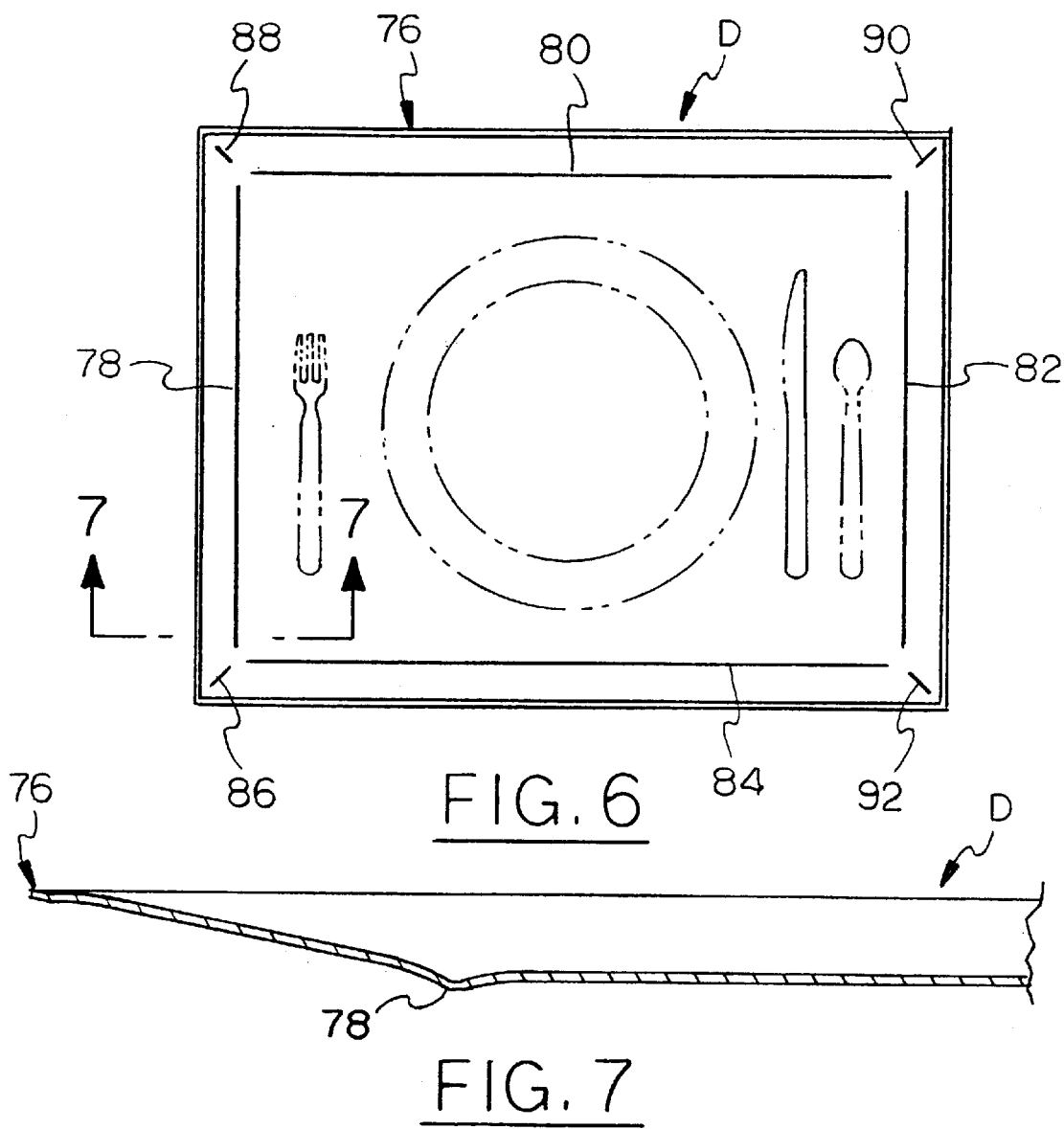

ANGULAR BORDER ON THREE DIMENSIONAL SHEET MATERIAL AND METHOD OF PRODUCING

FIELD OF INVENTION

This present invention relates to a plastic sheet three-dimensional receptacle or the like provided with a uniform border, and includes the method of manufacturing, thereby producing an attractive and finely finished article.

BACKGROUND OF INVENTION

A plastic sheet three-dimensional receptacle is known.

Plastic sheets, picture frames, and picnic plates have long been produced such as illustrated in U.S. Pat. Nos. 5,876,143; 5,059,052; 5,752,721; 5,417,509; 6,254,707.

Paper materials are less likely to be used today because they are easily torn or deformed requiring disposal.

OBJECTS AND SUMMARY OF THE INVENTION

It is an object of this invention to provide a plastic three-dimensional sheet.

Another object of this invention is to provide an inexpensive device easy to manufacture.

Still further object of this invention is to provide an attractive product.

A still further object of this invention is to provide a three dimensional article which can be stacked and packaged.

Yet another object of this invention is to provide a method for manufacturing a three dimensional article.

In summary this invention pertains to the manufacture of sheet material with an angular border and the method of manufacturing the same as will be described in the following description and the drawings which are as follows;

FIG. 6 is a modified version of the invention shown in top plan;

FIG. 7 is a cross-sectional view taken along the line 7—7 of FIG. 6 and viewed in the direction of the arrows;

DETAILED DESCRIPTION OF THE INVENTION

Figure 1:
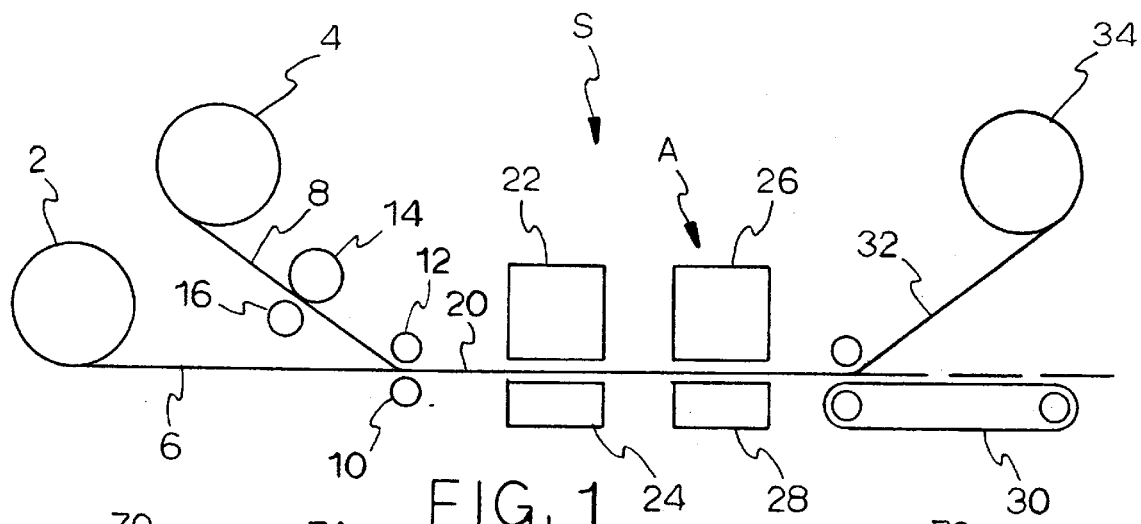
FIG. 1 is a schematic showing the manufacturing process.
Figure 2:
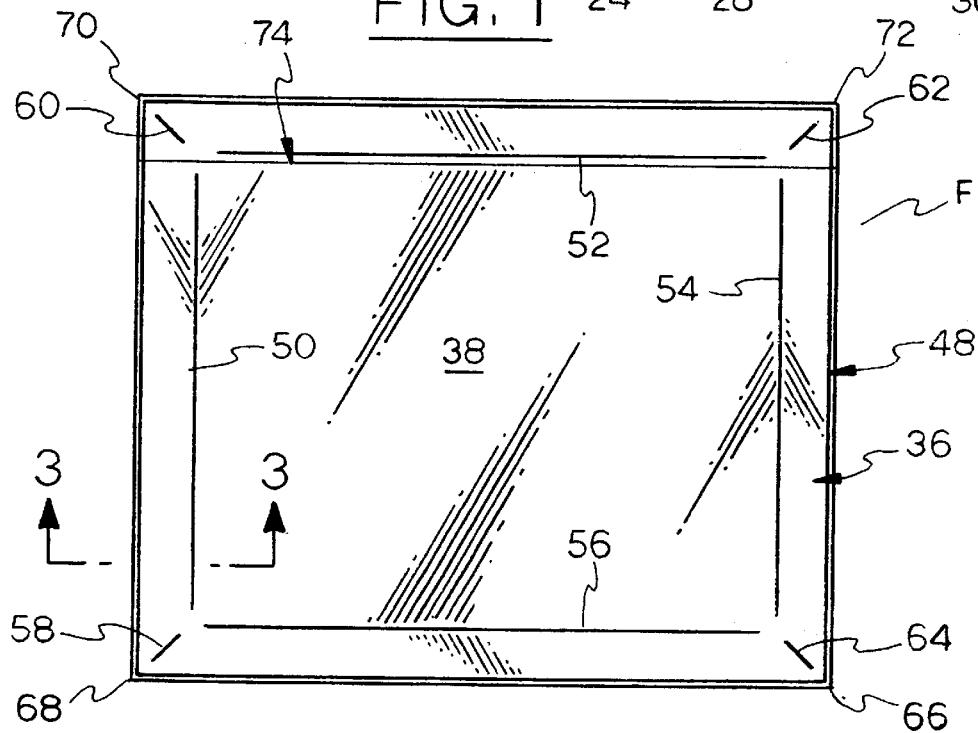
FIG. 2 is a top elevation view showing a three dimensional picture frame.

The FIG. 1 shows the system S set up to manufacture a picture frame. The system S includes a bottom roll of material 2 and a top roll of material 4. The material 2 is generally an opaque thermoplastic material of a thickness of from about 215 to about 245 microns or about 7½ to 11½ gauge. A top roll 4 is a thermal plastic material having a thickness of from about 170 to about 210 microns and a gauge of about 6½ to 8½. The preferred thickness of the material on roll 2 is about 230 microns or about 9 gauge. The preferred thickness for the top roll of thermoplastic material 4 is about 190 microns or about 7 gauge. The preferred plastic is polypropylene although other thermal plastic materials may be used such as acrylics for example.

The material on the roll 2 comes off of the roll 2 as a web sheet 6. The material from the roll 4 comes off as a web sheet 8. The sheets 6 and 8 come together at idler rolls 10 and 12. Web sheet 8 prior to entering the idler rolls 10 and 12 may be slit at one edge by a cutter 14 engaging a backup roll 16. The webs 6 and 8 form a 2-ply web 20 which is fed to a die stamping unit 22 having a platen beneath it 24. The unit 22 with the platen 24 simultaneously produce welds and cuts by the use of ultrasound in the manner shown in U.S. Pat. No. 6,254,707 granted Jul. 3, 2001 and as subsequently illustrated and described in FIGS. 8 through 11 of this description.

The 2-ply web 20 is fed to a stripper unit having an upper member 26 and a lower member 28. The stripper unit A causes the frame F best shown in FIGS. 2 through 5 to be released from the 2-ply web 20 and deposited on the conveyor 30 with the excess material 32 from the web 20 to be deposited on a collecting roll 34.

Figure 3:
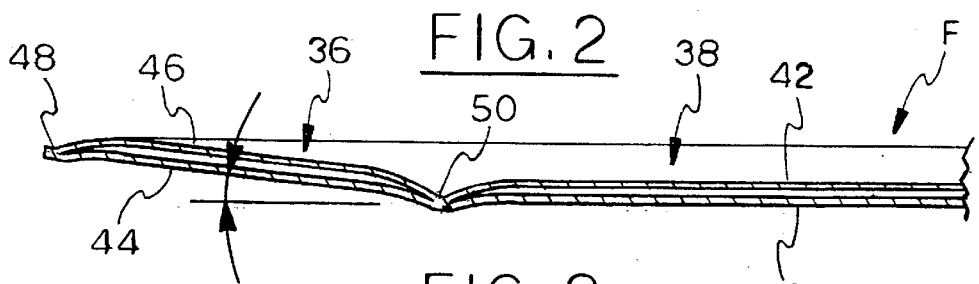
FIG. 3 is a cross-sectional view enlarged taken along the lines 3—3 of FIG. 2 and viewed in the direction of the arrows.
Figure 4:
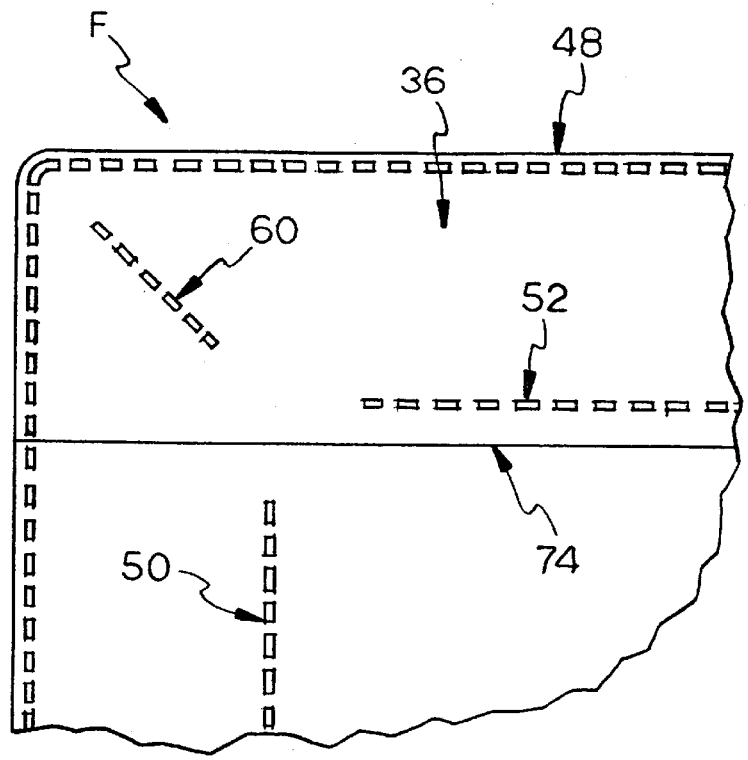
FIG. 4 is an enlarged fragmentary top planned view of a corner of the invention shown in FIG. 2.
Figure 5:
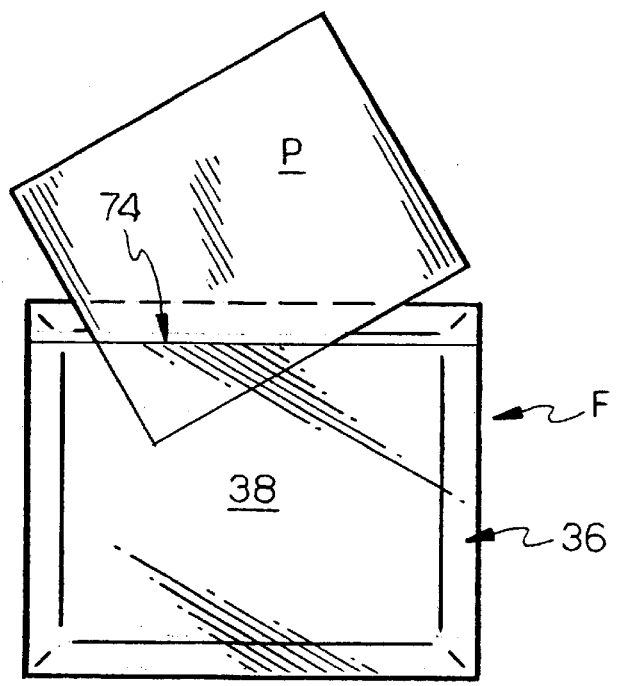
FIG. 5 is a top plan view showing an article being inserted into the three-dimensional invention illustrated in FIG. 2.
Figure 8:
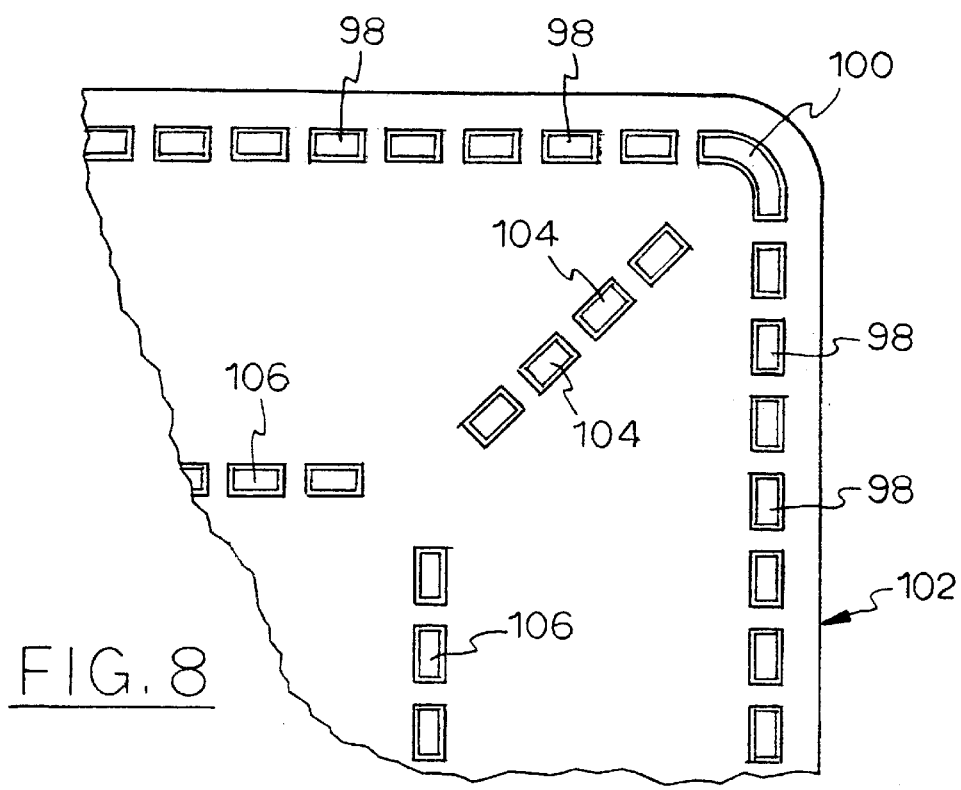
FIG. 8 is a fragmentary top plan view of the invention.

It will now be noted in FIGS. 2 through 5 that the frame F has a border 36, which runs around the central portion 38 comprised of the 2-ply 40 and 42 in the central portion as well as 2-ply 44 and 46 in the border as best shown in FIG. 3. It is to be noted that the plys 40 and 42 are co-extensive but not secured to each other except at the marginal edge weld 48 and the inner border welds 50, 52, 54 and 56. Diagonal welds 58, 60, 62, and 64 are provided which extend from the corners 66, 68, 70, and 72. The diagonal 58, 60, 62, and 64 do not touch the edge weld 48 which extends around the perimeter of the frame F. Diagonal welds 58, 60, 62, and 64 are spaced from about ⅛ to about ⅝ of an inch from the corners 66, 68, 70, and 72. The welds 50, 52, 54 and 56 comprise a series of welds which do not touch each other and are spaced from each other from about ⅛ to about ⅝ of an inch. Diagonal welds 58, 60, 62 and 64 do not touch the welds 50, 52, 54, and 56 and are spaced therefrom about ⅛ to about ⅝ of an inch. Preferably the spacing is approximately ½ inch between the diagonal welds 58, 60, 62, and 64 and the corners 66, 68, 70, 72 and the border welds 50, 52, 54, and 56.

The frame F has an opening 74 which is caused when the cutter 14 slits the web sheet 8 on one side thereof. The opening 74 permits insertion of a picture, paper or the like P into the opening 74 which forms a pocket in the central member 38 for display of the picture or other material which is inserted therein.

It will now be noted that the frame F at the border 36 is uplifted at an angle from the plain of the central member 38 at an angle from about 3 degrees to an elevation of about 15 degrees.

FIGS. 6 and 7

FIGS. 6 and 7 show a plate or dish-like construction D. In this construction, a single sheet of material is used coming from the bottom roll 2 without utilizing the upper roll 4 and is dye-stamped at 22 and 24 and stripped at stripper A and deposited on the conveyor 30 with the excess material 32 being picked on the collecting roll 34. The edge welds 76 and the border welds 78, 80, 82, 84, and the diagonal welds 86, 88, 90, and 92 all are stamped into the plate D.

FIGS. 8 through 11

Figure 9:
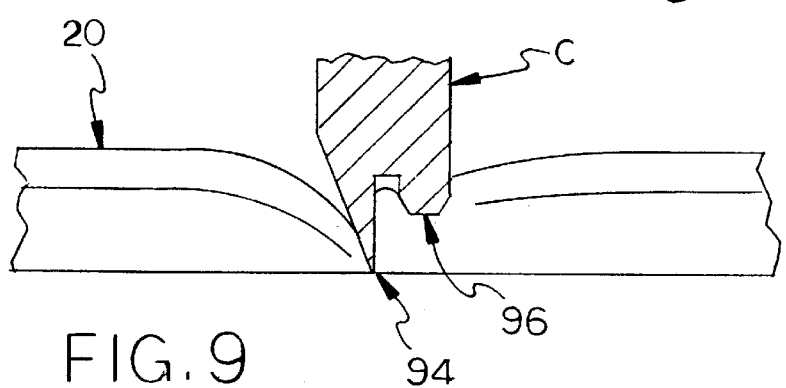
FIG. 9 is a enlarged fragmentary cross-sectional view showing the cutter and weld member for producing the marginal edge of the item shown in FIG. 8.
Figure 10:
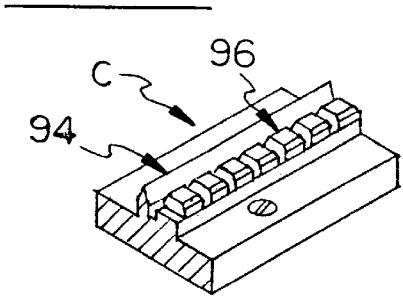
FIG. 10 is a fragmentary perspective view of the cutter shown in FIG. 9.
Figure 11:
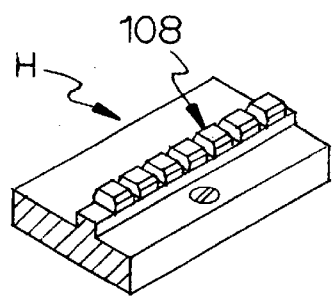
FIG. 11 is a fragmentary perspective view of the inner border shown in FIG. 8.

The welds discussed in the earlier description are all based on FIGS. 8 through 11 and the U.S. Pat. No. 6,254, 707. FIG. 9 shows the edge cutter 94 which cuts through the 2-ply 20 which is stripped from the article such as the frame F or the plate D. The castellated dyes C include the cutter 94 and the castellations 96. The castellations 96 form the spaced apart indentation 98 and 100 on the border with the edge cut 102. The inner diagonal welds 104 and the border welds 106 are formed by the dye H having the castellations 108. The dye H does not have a cutter 94 as does the castellated dye C. As in the aforementioned U.S. Pat. No. 6,254,707 ultrasound produces a vibration which produces sufficient heat and causes the bonding and welding of the plastic material. This affords an attractive frame F or plate D or other device of three dimensions. It is obvious that other configurations or devices not rectangular such as triangular or the like may be utilized by this process. The castelation aspect causes the deflection of the borders upwardly and depending upon the depth of the castellations and the length of time of the ultrasound at the point of contact with the sheet material, a deflection may be increased for example from about 3 degrees to about 15 degrees as desired which may also be determined by the delay in which the dyes are held before release. The depth of castelllation is from about 60% to about 80% of the thickness of the plastic sheet material.

What we claim is:

1. A method of producing a 3-dimensional receptacle from plastic sheet comprising the steps of:
   a) providing a first and second sheet of thermoplastic material wherein said second sheet of thermoplastic material is superimposed upon said first sheet of thermoplastic material;
   b) feeding said plastic sheets into a die cut/die weld ultrasonic assembly;
   c) causing said die cut/die weld assembly to engage said plastic sheets;
   d) die cutting by ultrasound said plastic sheets producing a peripheral edge substantially planar article having at least three corners each giving a center line;
   e) die welding by ultrasound a castellated margin adjacent said peripheral edge;
   f) die welding on said article by ultrasound a series of castellated inner seams each extending from adjacent one corner center line to adjacent the next surrounding corner center line and spaced a distance from said peripheral edge and each of said series extending parallel to said peripheral edge and forming a border and a central planar section;
   g) die welding by ultrasound on each if said corners center line, a diagonal castellated seam spaced from said castellated margin and extending adjacent said corners in adjacent castellated inner seams;
   h) releasing said die cut/die weld assembly from said plastic sheet causing said border to raise at said peripheral edge pivoting about each of said seams to form an angle to said central planar section; and
   i) removing said article from waste material produced by die cutting said article from said plastic sheets.

2. An article produced by the method of claim 1.

3. The method of claim 1 and wherein:
   a) said castellated margin is simultaneously die welded when said substantially planar article is die cut.

4. An article produced by the method of claim 3.

5. The method of claim 3 and where in:
   a) said series of castellated inner seams are simultaneously die welded when said castellated margin is die welded.

6. An article produced by the method of claim 5.

7. The method of claim 5 and where in:
   a) said diagonal castellated seams are simultaneously die welded when said castellated inner seams are die welded.

8. An article produced by the method of claim 7.

9. The method of claim 1 and including the steps of:
   a) die cutting/die welding said second sheet simultaneously to said first sheet ad forming at least one pocket between said first and second sheet; and
   b) slitting said second sheet prior to die cutting/die welding to provide a pocket opening for inserting material in at least said one pocket.

10. An article formed by the method of claim 9.

11. The method of claim 1 and including:
   a) die welding said sheet materials to a depth of between about 60% to about 80% of the thickness of the thermoplastic material plastic sheets; and
   b) forming said angle of said border to said central planer section sheet of between about 3° to about 15°.

12. An article formed by the method of claim 11.

13. The method of claim 1 and including:
   a) providing said first thermoplastic sheet of a thickness of from about 215 to about 245 microns.

14. An article formed by the method of claim 13.

15. The method of claim 9 and including;
   a) providing said second thermoplastic sheet of a thickness of about 170 to about 210 microns.

16. An article formed by the method of claim 15.

17. The method of claim 1 and including;
   a) providing a gap distance between said diagonal seams and said castellated margin of between about ⅛" to about ⅝"; and
   b) providing a gap distance between said diagonal seams and said adjacent castellated inner seams of between about ⅛" to about ⅝".

18. An article formed by the method of claim 17.

19. The method of claim 1 and;
   a) forming and said border of between about ¾" to about 1½".

20. An article formed by the method of claim 19.

* * * * *